United States Patent
Kito

[15] 3,684,330
[45] Aug. 15, 1972

[54] HYDRAULIC BRAKE PRESSURE CONTROL VALVE ASSEMBLY

[72] Inventor: Masahiro Kito, c/o Aisin Seiki Kabushiki Kaisha 1 Asahi-Machi 2-chome, Kariya, Japan

[22] Filed: July 7, 1970

[21] Appl. No.: 52,901

[30] Foreign Application Priority Data

| July 7, 1969 | Japan | 44/53558 |
| Dec. 9, 1969 | Japan | 44/117473 |
| Dec. 29, 1969 | Japan | 44/123851 |
| Dec. 29, 1969 | Japan | 44/125852 |
| Feb. 2, 1970 | Japan | 45/10930 |

[52] U.S. Cl. .................................303/54, 303/10
[51] Int. Cl. ...........................................B60t 15/06
[58] Field of Search....137/624.27; 303/6 A, 6 R, 10, 303/54; 60/54.5 P, 54.6 P

[56] References Cited

UNITED STATES PATENTS

| 2,404,122 | 7/1946 | Campbell | 303/54 |
| 2,420,313 | 5/1947 | Hall | 303/54 |
| 2,476,054 | 7/1949 | Loweke | 303/54 |
| 2,513,486 | 7/1950 | Herman | 303/54 |
| 2,698,205 | 12/1954 | Gagen | 303/54 |
| 3,284,143 | 11/1966 | Saftien | 303/54 |

*Primary Examiner*—Duane A. Reger
*Attorney*—Sughrue, Rothwell, Mion, Zinn & MacPeak

[57] ABSTRACT

A hydraulic pressure control valve assembly in a hydraulic brake system on a powered and wheeled vehicle having a self-contained hydraulic pressure source, preferably in the form of a pressure accumulator, said assembly being characterized by that the assembly is formed with a hydraulic pressure chamber and a slidable piston in the latter, an axial bore is formed through said piston, an elongated valve slide is slidably mounted in said axial bore, a valve part is formed on said valve slide, said valve part is so designed and arranged that the hydraulic live pressure coming from said pressure source may be applied on the both sides of said valve part when the latter is receded from a mating valve seat for practically balancing out the effect of said live pressure upon said valve part under occasional demand, said axial bore being provided in the hydraulic system extending from said pressure source and a reservoir and said valve being adapted for interruption of said hydraulic system when a manually operated braking member is actuated in its brake applying sense.

7 Claims, 8 Drawing Figures

3,684,330

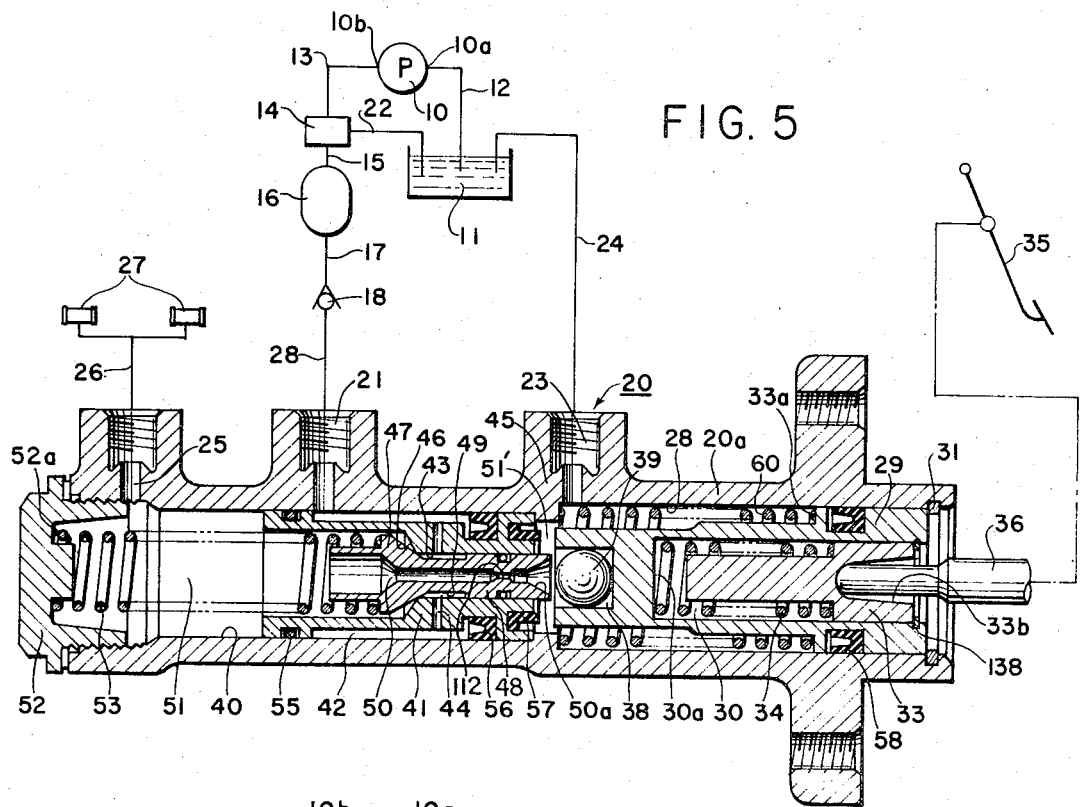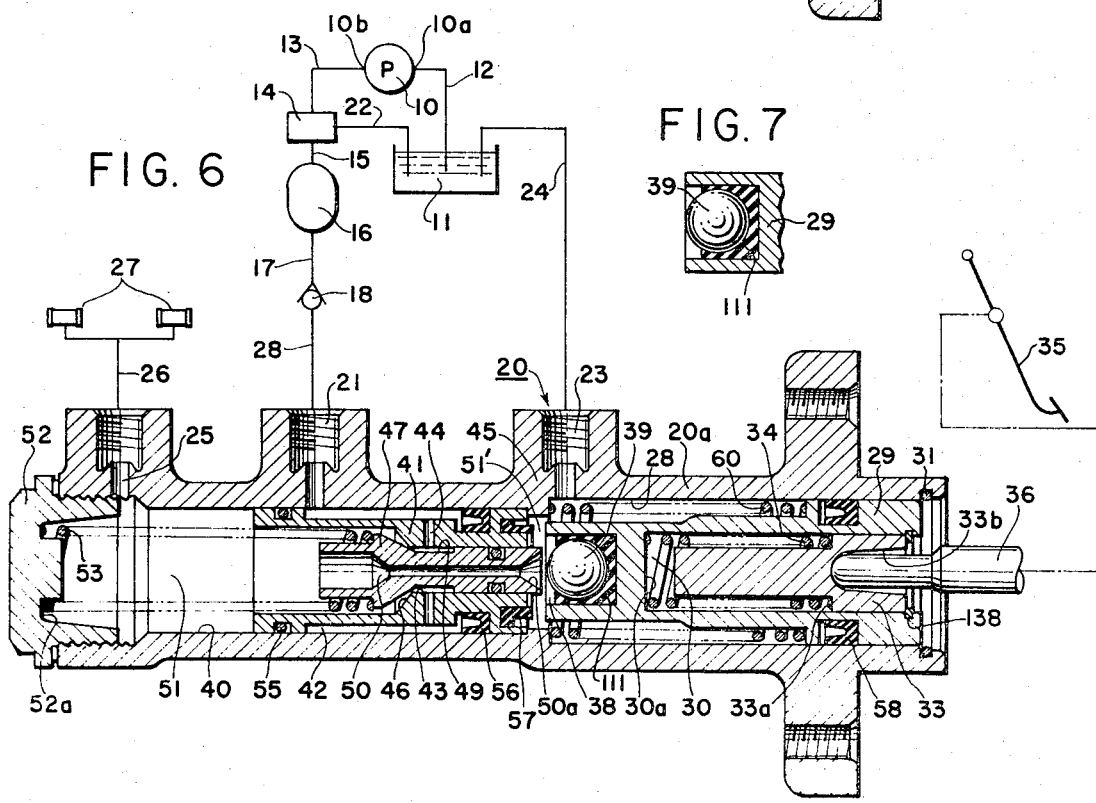

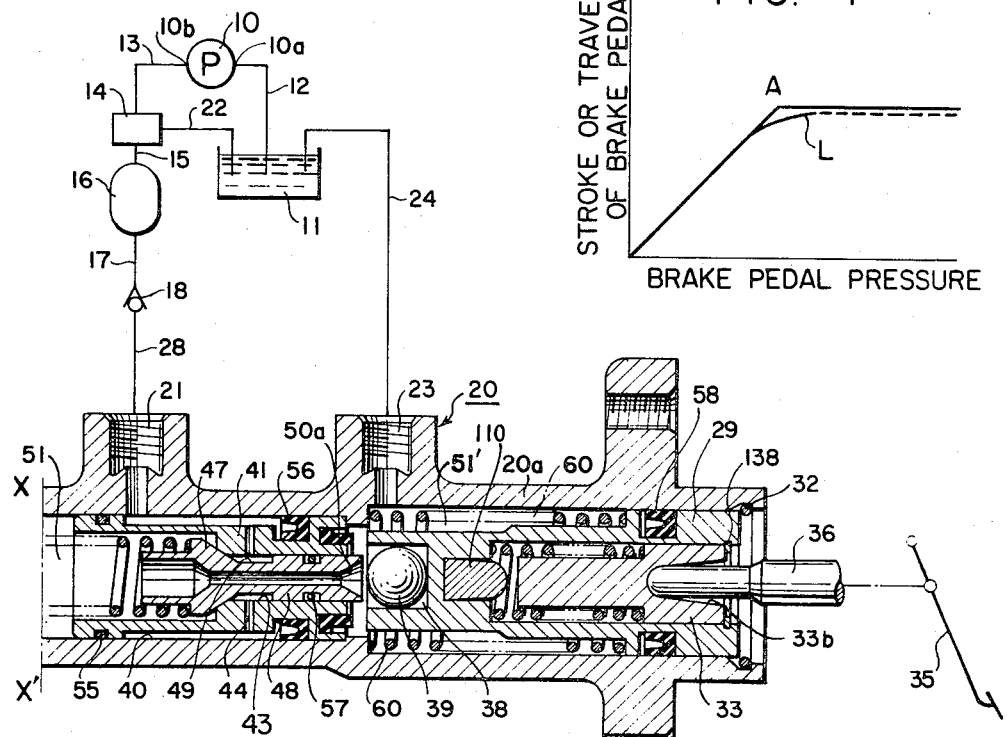
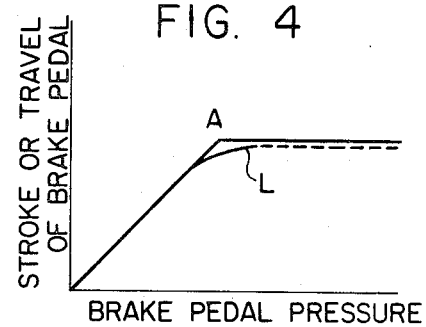
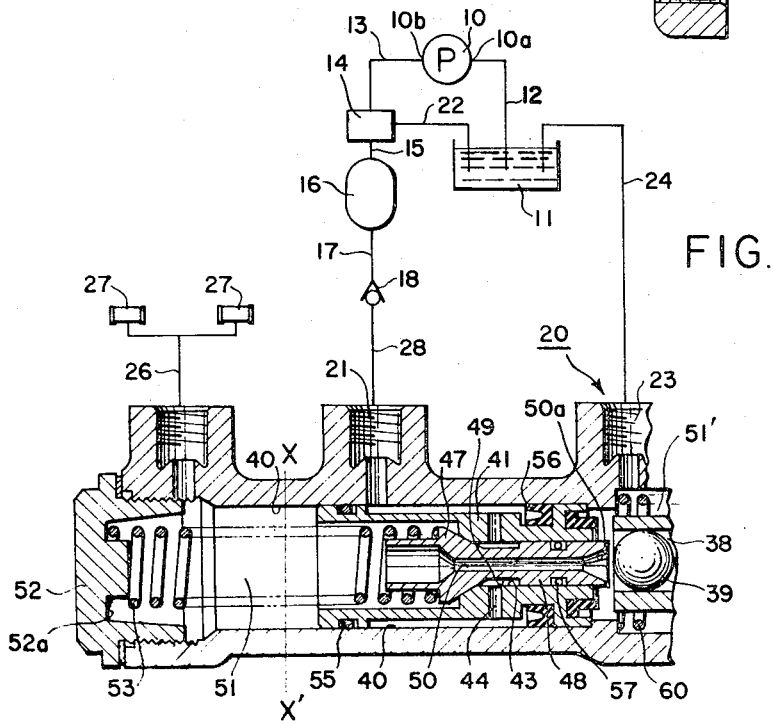

HYDRAULIC BRAKE PRESSURE CONTROL VALVE ASSEMBLY

This invention relates to improvements in and relating to the hydraulic brake pressure control valve assembly in the hydraulic brake system on an powered vehicle.

A substantial drawback frequently appearing in the above kind of hydraulic brake system having a pressure accumulator acting as a braking pressure fluid supplier is such that when the regular function of the accumulator fails, the desirous braking action will also fail to be obtained.

One of the objects of the present invention is to provide an improved hydraulic pressure control valve assembly to obviate the above-mentioned conventional drawback.

A further object is to provide a control valve assembly of the above kind, capable of performing a braking function, even with a slightest working stroke of the foot-operated brake pedal and in an efficient manner.

A further object is to provide an improved control valve assembly of the above kind wherein several main working parts thereof can be machined with substantially lesser degree of workmanship.

A still further object of the invention is to provide an improved control valve assembly of the above kind, capable of operating in an accurate and more reliable manner, yet with a lesser actuating effort for on-off control of the valve.

These and further objects, features and advantages of the invention will become more apparent when read the following detailed description of the invention by reference to the accompanying drawings illustrative of several preferred embodiments thereof shown only by way of examples.

In the drawings:

FIGS. 3A and 3B represents in combination a single longitudinal section of a third embodiment of the invention, as represented in the similar way to those shown in the foregoing, yet the partition lines being shown at X—X' in each of the partial figures.

FIG. 4 is a chart illustrative of the relationship between the braking stroke and the foot pedal actuating force.

FIGS. 5 and 6 are similar views to FIG. 1, illustrating, however, a fourth and a fifth embodiment of the invention, respectively.

FIG. 7 is a part of the sectional view shown in FIG. 6.

Figure 1:
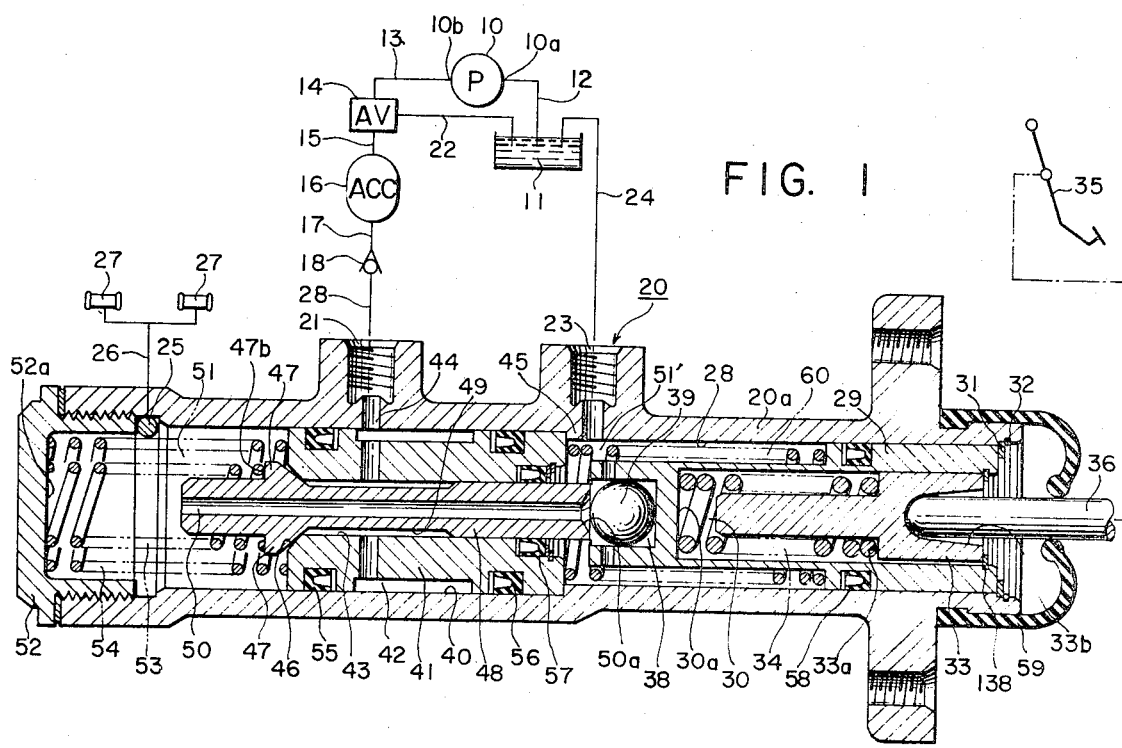
FIG. 1 is substantially a longitudinal axial section of a first embodiment of the hydraulic brake pressure control assembly according to this invention, wherein, however, a pressure accumulator and its related hydraulic circuit are additionally shown in a schematic way.

Referring now to FIG. 1 of the accompanying drawings, the first embodiment of the invention will be described in detail.

In FIG. 1, numeral 10 denotes an oil pump of conventional design which is adapted for being driven by an internal combustion engine, not shown, of a motored vehicle, although the drive connection has been omitted from the drawing only for simplicity. The suction side 10a of the pump 10 is fluidically connected through a suction pipe 12 with an oil reservoir 11 for sucking oil therefrom, while the delivery side 10b of the pump is fluidically connected through a delivery piping 13 to an accumulator charge valve 14 which is further connected through a further piping 15 to an accumulator 16 for the accumulation of oil pressure therein, as will be described hereinafter more in detail and may well be supposed from the schematic representation in FIG. 1 demonstrated as such on account of the very popularity of such hydraulic pressure accumulation arrangement.

The accumulator 16 is hydraulically connected through a piping 17, a check valve 18 and a further piping 28 to an inlet port 21 formed in the cylindrical housing 20a of a hydraulic pressure control valve assembly 20.

The charge valve 14 is fitted with a bypass piping 22 and this by-pass arrangement is so designed and arranged that when a hydraulic pressure in excess of a certain predetermined valve has been accumulated in the accumulator 16, the pressure fluid delivered from the pump 10 is then bypassed through piping 22 to reservoir 11.

The valve housing 20a is formed with a communication port 23 which is hydraulically connected through a piping 24 back to the reservoir 11. The housing 20a is further provided with a communication port 25 which is connected through a piping 26 to wheel cylinders 27 adapted for applying hydraulic braking force to vehicle wheels, not shown.

The construction of the hydraulic pressure control valve assembly 20 is as follows:

The valve housing 20a is formed longitudinally thereof with a multiple stepped cylindrical bore 28 which is opened at its right-hand end in FIG. 1 and receives slidably a valve holder 29 having a stepped cylindrical outside configuration. The outer or right-hand end of the valve carrier 29 abuts against a retainer snap spring 3, which abuts in turn against a stop ring 32, the both being held in position within the inside wall surface of said cylindrical bore 28. The piston-like valve carrier 29 is formed with a concentric and axially extending blind bore 30 in which a stepped piston-like motion transmitting member 33 is slidably mounted. This member 33 is formed with a circular shoulder 33a, a compression coil spring 34 being inserted under pressure between the latter and the end wall 30a of said bore 30.

At the outer or right-hand end of the motion transmitting member 33, the latter is formed with an axial recess 33b for receiving the inner end of a push rod 36 which is mechanically linked with a conventional brake pedal 35. Rightward movement of the member 33 is limited by a retainer spring 138 which is held in position in the inside wall of the bore 34.

At the inner end portion of valve carrier 29, an axially extending blind bore 38 is formed in which a valve ball 39 is turnably and axially movably received and with a small lateral idle gaps.

An enlarged part 40 of the stepped bore 28 occupying substantially a left-hand half of the bore as a whole, receives slidably a pressure piston 41 which is formed with an axially extending bore 43 and a ring groove 42 on its outer peripheral surface. There is provided a lateral passage 44 which establishes a fluid communication between the bore 43 and the ring groove 42.

The piston 41 abuts at its inner or right-hand end against a circular shoulder 45 formed on the inside wall of the bore 28, thus the rightward stroke of the hydraulic pressure piston 41 being limited thereby.

An axially bored, elongated valve part 48 is slidably received in the central bore 43, a valve seat 50a being formed at the inner end of the valve member and adapted for cooperation with valve ball 39. At an intermediate point between the end extremities of the valve rod 48 and in proximity of the outer end thereof, a valve part 47 is formed on the outer peripheral surface of the rod 48, so as to cooperate with a valve seat 46 formed centrally at the left-hand end of piston 41. On the main part of valve member 48, an elongated and shallow ring groove 49 is formed for providing a longer communication period between the ring fluid space 42 and the bore 43. Valve rod 48 is formed with an axial bore 50, so as to provide a fluid communication possibility between the otherwise separated two pressure oil chambers 51 and 51'.

A hollow screw plug member 52 is screwed to the left-hand open end of the cylindrical housing 20a, a compression coil spring 53, being inserted under pressure between the inside end wall 52a of the plug 52 and the shoulder at 47b of valve part 47. A similar compression coil spring 54 is inserted under pressure between the same end wall 52a and the outer end of pressure piston 41.

Several sealing rings 55, 56, 57, and 58 are provided as shown for establishing effective seal at the respective positions.

Numeral 59 denotes an elastic dust cover attached to the right-hand end of the housing 20a for the prevention of invasion of dusts from outside of the control valve assembly under consideration into the interior spaces thereof.

A return spring 60 is provided under pressure between piston 41 and valve carrier 29.

A coil spring 34 is also provided between the inside end wall 30a of valve carrier 29 and motion transmission member 33.

The operation of the first embodiment so far shown and described is as follows:

When the vehicle is running and the driver presses the brake pedal 35 with his foot pressure, motion will be transmitted therefrom through push rod 36 to the transmitting member 33, the latter being thereby moved leftwards through the valve carrier 29 being shifted again leftwards through the intermediary of spring 34. By this operation, valve ball 39 is brought into sealing contact with valve seat 50a, so as to interrupt fluid communication between pressure chamber 51 and reservoir 11. With further depression of brake pedal 35, valve rod 48 carrying valve part 47 is moved further leftwards, thereby the latter being separated from its mating valve seat 46. Then, hydraulic accumulator will be conveyed from accumulator 16 into pressure oil chamber 51, thence through ring groove 49, port 25 and piping 26 into wheel cylinders 27 for performing a braking function as known per se.

Since the hydraulic pressure acts at this stage upon the cross-sectional area of valve rod 48 which pressure is transmitted to the brake pedal 35 and in the reverse direction to the transmitting course of the brake actuating effort, thereby the driver feeling the thus reversedly transmitted hydraulic pressure as the reaction force. In this way, the driver can sense physically the occasional braking effort in the form of pedal reaction.

With the brake pedal 35 still further depressed, the left-hand end of the member 33 is brought into direct contact with the bottom of the axial recess 33b and the inner end of valve carrier 29 is brought into engagement with piston 41. At this stage, the driver will sense a reaction in the form of the hydraulic pressure prevailing in the chamber 51 and acting upon the cross-sectional area of piston 41. Thus, the reaction force has been substantially increased from that of the foregoing stage. It will be seen that at this braking stage, the piston 41 acts as a kind of stopper means.

Now assumed that the hydraulic pressure source or accumulator 16 be inoperative by a certain or other cause and a braking effort is applied to the brake pedal, the left-hand end of the member 29 will urge as before the piston 41 to move leftwards against the action of spring 54, thereby the hydraulic pressure in the chamber 51 being increased rapidly. Therefore, the related mechanism will act in the similar way as the conventional master cylinder.

It will be seen from the foregoing that, should the valve 47 fail to operate properly, the hydraulic pressure coming from the accumulator and prevailing in the ring space 49 will act upon the both sides of the said valve and represent substantially no effect thereupon, the valve, therefore, being kept in pressure contact with its mating valve seat substantially exclusively under the spring force at 53. In addition, the valve ball 39 can be brought into engagement with its valve seat 50a substantially freely and thus a precise centering of the axial bore 50 can be dispensed with. The same can be applied to the machining of several parts such as at 40, 43, and 47.

Figure 2:
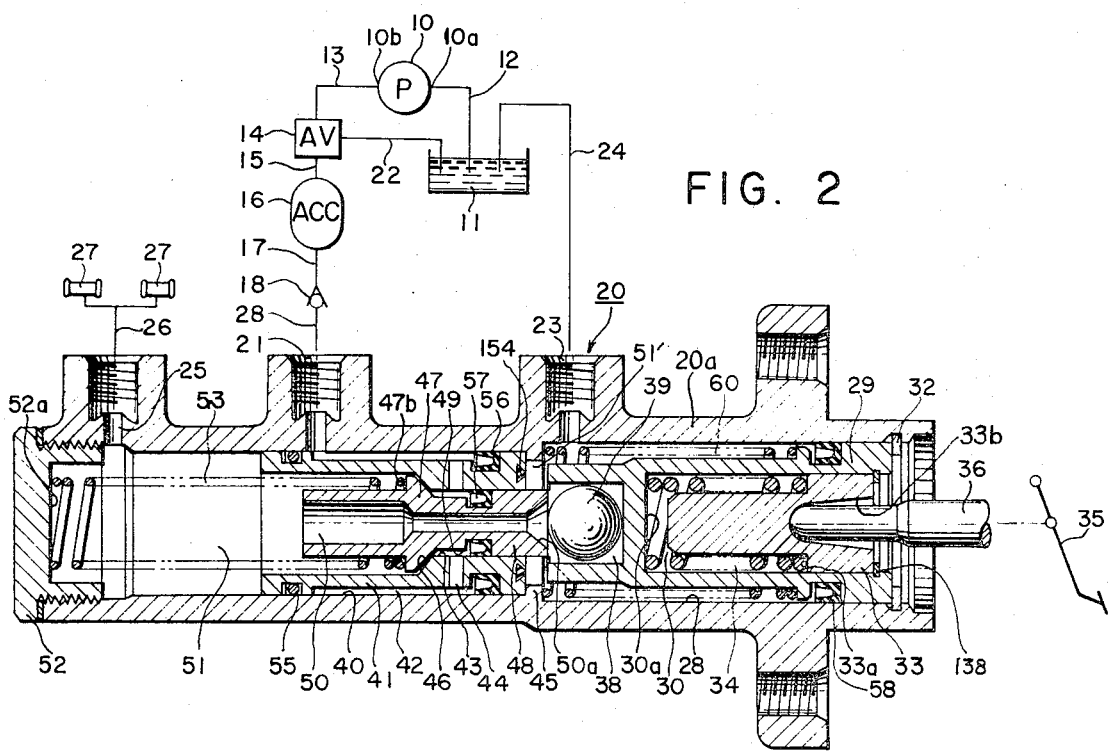
FIG. 2 is a similar view to FIG. 1, illustrating, however, a second embodiment of the invention.

Referring next to FIG. 2, the second embodiment of the invention will be described hereinbelow.

As seen, the substantial structure of the control valve assembly is same as that of the first embodiment, and therefore, same or similar constituents have been denoted with respective same reference numerals.

More specifically, the constituent parts denoted
10; 10a; 10b; 11; 12; 13; 14; 15; 16; 17; 18; 19; 20; 20a; 21; 22; 23; 24; 25; 26; 27; 28; 29; 30; 31; 32; 33; 33a; 33b; 34; 35; 36; 37; 38; 39; 40; 41; 42; 43; 44; 45; 46; 47; 48; 49; 50; 50a; 52; 52a; and 53
are similar to those shown in the foregoing.

In the present embodiment, the foregoing spring 51 has been dispensed with. In addition, a ring seal 154 is fixedly mounted on the inner end of the piston 41 for occasional sealing cooperation with the inner end of the member 29 in the case where the accumulator 13 should fail to perform its regular operation.

The regular operation of the second embodiment is substantially same as before, irrespective of occasional minor difference in the configuration of several constituent parts in comparison with those correspondingly employed in the first embodiment.

When it is assumed that in the present second embodiment the accumulator 13 should fail to function in its regular service, and that the brake pedal is actuated for performing the braking service as before, the member 29 is moved equally and the left-hand end thereof is brought into tight engagement with said seal 154, thereby the piston 41 being urged to move leftwards against the action of spring 53 so that the hydraulic pressure in the chamber 51 is increased suddenly, for providing a kind of the conventional master cylinder effect. In this embodiment, the sealing member 154 is provided on the end of piston 41. Instead thereof, same seal may be fitted on the inner end of the member 29.

In the third embodiment of the invention shown in FIGS. 3A and 3B in combination, the valve carrier 29 is fitted centrally and axially with a sealing member 110 which projects slightly from the main body of the carrier outwardly thereof for occasional cooperation with the inner end of the motion transmitting member 33. This sealing member 110 is made of soft rubber or the like elastic material.

Other constituent parts of the pressure control valve assembly are substantially similar in their design, arrangement and function, regardless of minor changes in their configuration, to those shown in FIG. 1. Therefore, these parts have been denoted with respective same reference numerals as before.

The specific effect obtainable by the provision of the soft bar-like sealing member 110 will be easily understood by a glance of FIG. 4. In this chart, the stroke is plotted against the foot pedal pressure as shown.

By failure of the provision of said member 110, the progress of the stroke of the pedal is proportional to the pedal pressure, until a certain predetermined point as at A is reached.

When the spring 34 has been fully compressed and the left-hand end of motion transmitter 33 is brought into direct contact with the end wall 30a of the bore 30 of valve carrier 29 in a non-elastic way (at the said point A), a further increase of the pedal pressure will invite no increase of travel of the pedal, this condition being frequently called "non-travel condition of brake pedal" among those skilled in the art. This happens to take place in a sudden and abrupt way and the driver who operates the brake pedal will feel naturally an unpleasant reaction.

With the arrangement where the provision of the elastic member 110 is made in accordance with the teachings of the present embodiment, the characteristic curve will further progress along a modified curve L. Therefore, with this improved arrangement including the elastic member 110, the driver will feel such reaction as if there be provided the conventional master cylinder.

With failure of the accumulator pressure, the mechanism will act in the similar manner as before.

In the fourth embodiment of the control valve assembly shown in FIG. 5, the axial bore 50 formed in valve slide 48 is formed in turn with a reduced or throttle part 112. Other parts of the valve assembly are substantially similar to those commonly employed in the foregoing several embodiments and thus denoted respective same reference numerals, irrespective of minor difference in their design, arrangement and function.

When the longitudinal bore 50 is not formed with the reduced or throttling part 112, and the application of the manual braking effort upon the brake pedal 35 is rather sudden and abrupt, it may frequently be encountered that the valve slide 48 performs disadvantageously a fluctuating movement in its axial direction.

If this fluctuating movement of the valve slide should occur, the driver will feel unpleasant reactive force at his manipulating foot in the form of vibrations. In addition, the valve part 47 and its mating seat 46 may be subjected to a rapid and appreciable damage on their valving surfaces. By the provision of said throttling part 112, these drawbacks can be remedied effectively.

In the last and fifth embodiment of the control valve assembly according to the invention, the valve-ball receiving recess 38 is attached with a resilient buffer ring 111 which is partially enclosing and resiliently positioning the valve ball 39 in position, as most clearly be seen from FIG. 7.

This buffering and positioning means 111 may be fabricated normally soft rubber or plastic material. Under occasion, this ring 111 may be replaced by a coil ring upon modifying slightly its entire configuration. A slight and unavoidable uneccentric formation of the valve seat 50a for the valve ball 39 can thus be compensated in an easy and effective way, thus assuring a positive and accurate valving cooperation between the both parts 39 and 50a.

Other constituent parts are similar to those commonly employed in the foregoing several embodiments and thus have been denoted with respective same reference numerals, irrespective of minor difference in their design, arrangement and function from those shown in the foregoing.

The embodiments of the invention in which an exclusive property or privilege is claimed are as follows:

1. A hydraulic pressure control valve assembly for a vehicle power brake system comprising in combination:
    a. a hollow cylindrical housing having a pressure chamber provided therein, said pressure chamber adapted for hydraulic communication with wheel brake actuating means of a vehicle;
    b. a valve carrier slidably mounted in said cylinder and mechanically connected with a manually operated brake pedal;
    c. a piston slidably mounted within said pressure chamber adjacent said valve carrier, said piston having an axial bore therethrough, said piston further including a circumferential groove formed in its outer surface and a passage formed in said piston communicating said groove with said axial bore;
    d. an elongated valve member slidably positioned in said axial bore of said piston, said elongated valve member having an axial bore therethrough, said elongated valve member having an external surface portion cooperating with a valve seat formed on said piston around said axial bore therethrough on the end of said piston extending into said pressure chamber;
    e. a ball valve retained by the end of said valve carrier positioned adjacent said piston for cooperation with the end of said elongated valve member opposite said pressure chamber for selectively blocking said axial bore through said elongated valve member;
    f. biasing means disposed in said pressure chamber cooperation with said elongated valve member to bias said elongated valve member in the direction of said piston to move said elongated valve member into sealing engagement with the valve seat formed in said piston;

g. first passage means communicating a hydraulic pump and regulator means with a port formed in said hollow cylindrical housing, said first port communicating with said groove formed in said piston slidably mounted within said pressure chamber, a pressure accumulating means connected in said first passage means between said first port and said pressure regulator, and a check valve means provided between said groove in said piston and said accumulator means, said pump means being operatively connected with a hydraulic reservoir, and a second passage means communicating said hydraulic reservoir with a second port formed in said hollow cylindrical housing between said valve carrier and the end of said piston opposite said pressure chamber, said ball valve adapted for blocking communication between said pressure chamber and said second port through the axial bore in said elongated valve member.

2. A hydraulic pressure control valve assembly as recited in claim 1, wherein said hollow cylindrical housing is provided with a circular shoulder (45) on its inner bore against which said piston normally abuts in response to the biasing force on said elongated valve member.

3. A hydraulic pressure control valve assembly as recited in claim 1, wherein said check valve is provided in said first passage means between said accumulator and said ring groove of the piston.

4. A hydraulic pressure control valve assembly as recited in claim 1, further comprising a ring seal (154) positioned in the end of said piston opposite said pressure chamber for occasional sealing cooperation with said valve carrier.

5. A hydraulic pressure control valve assembly as recited in claim 1, further comprising a resilient projection (110) provided between said valve carrier and a motion transmitting member linked with said brake pedal.

6. A hydraulic pressure control valve assembly as recited in claim 1, wherein said axial bore of said valve member is formed with a reduced diameter portion (112).

7. A hydraulic pressure control valve assembly as recited in claim 1, wherein said inner end of said valve carrier is formed with a valve-ball receiving pocket in which a resilient buffer ring 111 is attached for resiliently positioning said valve ball.

* * * * *